United States Patent
Benabdelaziz et al.

(10) Patent No.: US 10,483,874 B2
(45) Date of Patent: Nov. 19, 2019

(54) REVERSIBLE AC-DC AND DC-AC THYRISTOR CONVERTER

(71) Applicant: STMicroelectronics (Tours) SAS, Tours (FR)

(72) Inventors: Ghafour Benabdelaziz, Tours (FR); Cedric Reymond, Tours (FR); David Jouve, Saint-Antoine-du-Rocher (FR)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

(21) Appl. No.: 16/020,431

(22) Filed: Jun. 27, 2018

(65) Prior Publication Data
US 2019/0006959 A1    Jan. 3, 2019

(30) Foreign Application Priority Data
Jun. 30, 2017 (FR) .................... 17 56180

(51) Int. Cl.
*H02M 7/757* (2006.01)
*H02M 7/77* (2006.01)
(Continued)

(52) U.S. Cl.
CPC ......... *H02M 7/757* (2013.01); *H02M 7/5388* (2013.01); *H02M 7/797* (2013.01); *H02M 7/81* (2013.01); *H02M 2001/0003* (2013.01)

(58) Field of Classification Search
CPC ........ H02M 7/757; H02M 7/77; H02M 7/797; H02M 7/81; H02M 7/06; H02M 7/217
See application file for complete search history.

(56) References Cited

U.S. PATENT DOCUMENTS

| | | | | |
|---|---|---|---|---|
| 3,538,419 A | * | 11/1970 | Akio | .............. H02M 1/06 363/136 |
| 3,694,727 A | * | 9/1972 | Seki | ............. H02M 7/5152 363/138 |

(Continued)

FOREIGN PATENT DOCUMENTS

| | | |
|---|---|---|
| EP | 3109988 A1 | 12/2016 |
| FR | 2315794 A1 | 1/1977 |
| WO | 2017122519 A1 | 7/2017 |

OTHER PUBLICATIONS

INPI Search Report and Written Opinion for FR 1756179 dated Jan. 17, 2018 (8 pages).

(Continued)

*Primary Examiner* — Adolf D Berhane
*Assistant Examiner* — Sisay G Tiku
(74) *Attorney, Agent, or Firm* — Crowe & Dunlevy

(57) ABSTRACT

A reversible converter includes a first field effect transistor and a second field effect transistor coupled in series between a first terminal and a second terminal for a DC voltage. A first thyristor and a second thyristor are coupled in series between the first and second terminals for the DC voltage. A third thyristor and a fourth thyristor are also coupled in series between the first and second terminals for the DC voltage terminals, but have an opposite connection polarity with respect to the first and second thyristors. A midpoint of connection between the first and second field effect transistors and a common midpoint of connection between the first and second thyristors and the third and fourth thyristors are coupled to AC voltage terminals. Actuation of the transistors and thyristors is controlled in distinct manners to operate the converter in an AC-DC conversion mode and a DC-AC conversion mode.

14 Claims, 6 Drawing Sheets

(51) Int. Cl.
*H02M 7/797* (2006.01)
*H02M 7/81* (2006.01)
*H02M 7/217* (2006.01)
*H02M 7/06* (2006.01)
*H02M 7/5388* (2007.01)
*H02M 1/00* (2006.01)

(56) References Cited

U.S. PATENT DOCUMENTS

| | | | | |
|---|---|---|---|---|
| 4,220,989 | A * | 9/1980 | Perilstein | H02M 7/527 363/124 |
| 4,334,265 | A * | 6/1982 | Thorborg | H02M 7/5152 363/138 |
| 4,555,752 | A * | 11/1985 | Kurosawa | H02M 7/1623 323/207 |
| 5,047,913 | A * | 9/1991 | De Doncker | H02M 7/4826 363/138 |
| 5,412,557 | A * | 5/1995 | Lauw | H02M 5/4505 363/132 |
| 5,499,178 | A * | 3/1996 | Mohan | H02J 3/01 307/105 |
| 5,880,949 | A * | 3/1999 | Melhem | H02M 7/538 363/138 |
| 6,069,809 | A * | 5/2000 | Inoshita | H02M 7/53871 363/132 |
| 6,091,615 | A * | 7/2000 | Inoshita | H02M 7/53873 363/132 |
| 9,595,876 | B2 * | 3/2017 | Nielsen | H02M 3/33584 |
| 9,787,211 | B1 * | 10/2017 | Schneider | H02M 1/12 |
| 9,935,561 | B2 * | 4/2018 | Ide | B60L 11/1812 |
| 9,941,784 | B1 | 4/2018 | Li et al. | |
| 2001/0036086 | A1 | 11/2001 | Pascu et al. | |
| 2002/0176261 | A1 | 11/2002 | Norrga | |
| 2009/0268496 | A1 * | 10/2009 | Tan | H02M 1/4216 363/126 |
| 2012/0212984 | A1 * | 8/2012 | Yamada | H02M 7/219 363/89 |
| 2012/0268084 | A1 * | 10/2012 | Wang | H02M 1/4225 323/208 |
| 2015/0131343 | A1 * | 5/2015 | Hufnagel | H02M 1/42 363/49 |
| 2016/0301326 | A1 * | 10/2016 | Gonthier | H02M 1/081 |
| 2016/0373021 | A1 * | 12/2016 | Gonthier | H02M 1/32 |

OTHER PUBLICATIONS

INPI Search Report and Written Opinion for FR 1756180 dated Jan. 22, 2018 (8 pages).

"Totem-Pole Bridgeless PFC Design Using MC56F82748," NXP Semiconductors Design Reference Manual, Document No. DRM174, Rev. 0, Nov. 2016 (44 pages).

EPO Search Report and Written Opinion for co-pending EP Appl. No. 18178859.7 dated Sep. 19, 2018 (10 pages).

Baharom Rahimi et al: "A high power factor bidirectional battery charger using single-phase matrix converter", 2015 IEEE 10th Conference on Industrial Electronics and Applications (ICIEA), IEEE, Jun. 15, 2015 (Jun. 15, 2015), pp. 1397-1402, XP032816039, DOI: 10.1109/ICIEA.2015.7334327 [extrait le Nov. 20, 2015] * p. 1398-p. 1401; figures 4-13*.

* cited by examiner

US 10,483,874 B2

REVERSIBLE AC-DC AND DC-AC THYRISTOR CONVERTER

PRIORITY CLAIM

This application claims the priority benefit of French Application for Patent No. 1756180, filed on Jun. 30, 2017, the content of which is hereby incorporated by reference in its entirety to the maximum extent allowable by law.

TECHNICAL FIELD

The present application generally relates to electronic circuits and, more particularly, to switching converters called totem pole output converters, or midpoint cascode converters.

BACKGROUND

Switching converters are used in numerous applications and numerous types of converters are known.

Numerous rectifier bridge architectures and other bridge-less architectures are known among AC-DC converters, based on switching two transistors (generally MOS transistors) mounted in midpoint cascode (totem pole).

These converters are generally used for their efficiency in correcting the power factor (Power Factor Corrector—PFC).

There is a need to improve totem pole converters.

SUMMARY

One embodiment provides a reversible totem pole converter architecture.

One embodiment provides a solution compatible with a limitation of the inrush current.

In an embodiment, a reversible AC-DC converter comprises: a first field effect transistor and a second field effect transistor in series between a first terminal and a second terminal intended for a DC voltage; an inductive element linking a first midpoint of the association in series of the two transistors to a first terminal intended for an AC voltage; a first thyristor and a second thyristor in series between the DC voltage terminals, a second midpoint of the association in series of the first thyristor and the second thyristor being linked to a second terminal intended for the AC voltage, an anode of the first thyristor and a cathode of the second thyristor being linked to said second midpoint; and a third thyristor and a fourth thyristor in series between the DC voltage terminals, a cathode of the third thyristor and an anode of the first thyristor being linked to said second midpoint.

According to one embodiment: a first diode is in parallel with the first transistor, on the first midpoint anode side, and a second diode is in parallel with the second transistor, on the first midpoint cathode side.

According to one embodiment, each diode is defined by the drain-source intrinsic diode of the transistor concerned.

According to one embodiment, the thyristors are cathode triggered.

According to one embodiment: the first thyristor and the fourth thyristor are cathode triggered, and the second thyristor and the third thyristor are anode triggered.

According to one embodiment: the first thyristor and the fourth thyristor are anode triggered, and the second thyristor and the third thyristor are cathode triggered.

According to one embodiment, in an AC-DC conversion mode: the second thyristor is switched on continuously during alternations of a first sign of the AC voltage; the first thyristor is switched on continuously during alternations of a second sign of the AC voltage; the second transistor is pulse controlled during the alternations of the first sign; and the first transistor is pulse controlled during the alternations of the second sign.

According to one embodiment, the first diode serves as a freewheeling diode.

According to one embodiment, in a DC-AC conversion mode: the fourth thyristor is switched on continuously during alternations of a first sign of the AC voltage; the third thyristor is switched on continuously during alternations of a second sign of the AC voltage; the first transistor is pulse controlled during the alternations of the first sign; and the second transistor is pulse controlled during the alternations of the second sign.

According to one embodiment, the second diode serves as a freewheeling diode.

BRIEF DESCRIPTION OF THE DRAWINGS

These features and advantages, as well as others, will be disclosed in detail in the following non-restrictive description of particular embodiments in relation to the accompanying figures in which.

DETAILED DESCRIPTION

The same elements have been designated by the same references in the different figures. In particular, structural and/or functional elements common to the various embodiments may have the same references and may have identical structural, dimensional and material properties.

For the sake of clarity, only the steps and elements useful to the understanding of the embodiments that will be described have been represented and will be given in detail. In particular, the final application of the converter has not been detailed, the described embodiments being compatible with the common applications of AC-DC, DC-AC or reversible converters.

Unless specified otherwise, when reference is made to two interconnected elements, this means directly connected without any intermediate element other than conductors, and when reference is made to two interlinked elements, this means that these two elements may be directly linked (connected) or linked via one or more other elements.

In the description that follows, the expressions "approximately", "substantially" and "of the order of" mean within 10%, preferably within 5%.

Figure 1:
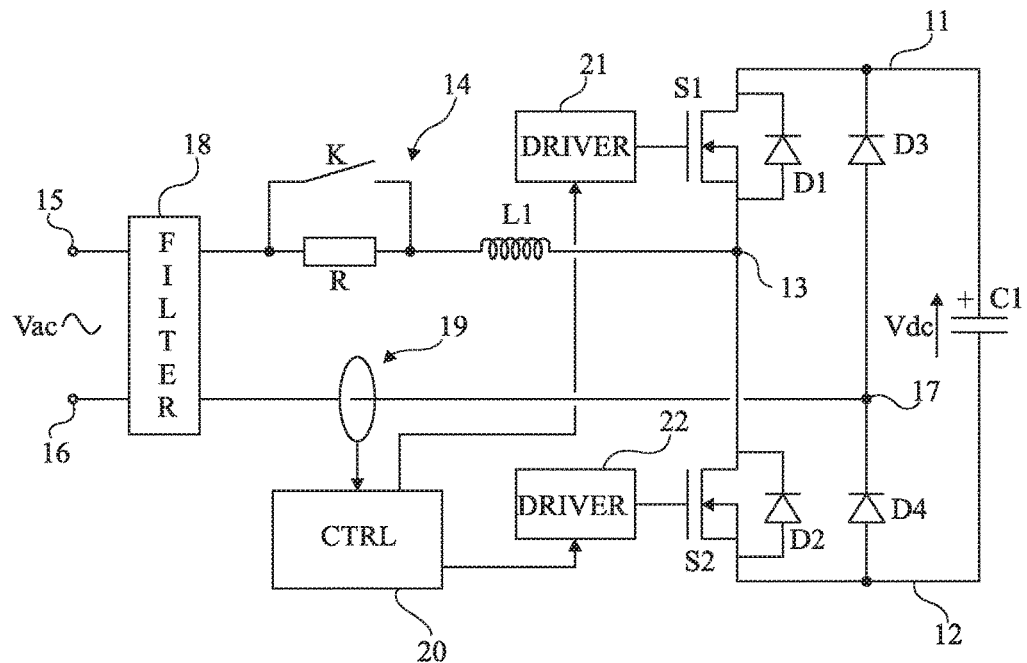
FIG. 1 is a wiring diagram of a common example of a totem pole AC-DC converter.

FIG. 1 is a wiring diagram of a common example of a totem pole AC-DC converter.

A totem pole converter is based on the use of two MOS transistors (here N-channel transistors) S1 and S2, connected in series between two terminals 11 and 12 for supplying a DC voltage Vdc. The drain of the transistor S1 is on the terminal 11 side and the source of the transistor S2 is on the terminal 12 side. A storage element C1 (capacitor or battery, for example) of the DC energy links the terminals 11 and 12, the terminal 11 being, arbitrarily, the positive terminal of the voltage Vdc. The midpoint 13 between the two transistors S1 and S2 is linked, via an inductive element L1 in series with a circuit 14 for limiting the inrush current and losses in steady state, to a first terminal 15 applying an AC voltage Vac. The circuit 14 is, for example, a resistor R (with a positive PTC or negative NTC temperature coefficient) in parallel with a switch K. The resistor R limits the inrush current at start-up and the switch K short circuits the resistor in steady state to limit the resistive losses once the voltage balance is reached. A second terminal 16 applying the AC voltage Vac is linked to the midpoint 17 of an association in series of two diodes D3 and D4 connected between the terminals 11 and 12. The anodes of the diodes D3 and D4 are respectively on the midpoint 17 side and terminal 12 side.

In practice, the terminals 15 and 16 correspond to the connection terminals connecting to the electrical distribution network and an input filter 18 (FILTER), or mains filter, is interposed between on the one hand the terminal 15 and the circuit 14 and, on the other hand, the terminal 16 and the midpoint 17. An element 19 for measuring the AC current is interposed between the filter 18 and the midpoint 17. The information representative of the current, measured by the element 19, is used by a control circuit 20 (CTRL) for controlling the conduction periods of the transistors S1 and S2. The circuit 20 receives other information such as, for example, information representative of the voltage Vdc, information representative of the energy requirements of the load connected to the terminals 11 and 12, etc. The circuit 20 supplies control signals to circuits (DRIVER) 21 and 22 for generating control signals for controlling the gates of the respective transistors S1 and S2. The intrinsic source-drain diodes D1 and D2 of the transistors S1 and S2 are also represented in FIG. 1. The transistors S1 and S2 are controlled in pulse width modulation according to the requirements of the load connected to the terminals 11 and 12. The pulse frequency is generally fixed and is markedly higher (ratio of at least 100, e.g. from a few kHz to a few hundreds of kHz) than the frequency of the voltage Vac (generally less than 100 Hz, typically 50 Hz or 60 Hz for the electrical distribution network).

The operation of the totem pole converter in FIG. 1 is as follows. For simplicity, the presence of the filter 18 is not taken into account, but it is of course passed through by the current from the terminals 15 and 16 and towards these terminals.

During the positive alternations of the voltage Vac, the transistor S2 is controlled in pulse width modulation to be periodically closed (on) and the transistor S1 remains permanently open (off). Furthermore, the source-drain diode D2 of the transistor S2 is reverse biased while the source-drain diode D1 of the transistor S1 is forward biased and serves as a freewheeling diode. During the closure pulses of the transistor S2, the inductor L1 stores energy. The current flows from the terminal 15, via the inductor L1, the transistor S2 and the diode D4 to the terminal 16. The DC load connected to the terminals 11 and 12 is powered by the energy stored in the energy storage element C1 (capacitor or battery). At each opening of the transistor S2, the energy stored in the inductor L1 is transferred to the DC load. The current then flows from the inductor L1, via the diode D1 of the transistor S1 to the positive terminal 11, then from the negative terminal 12, via the diode D4 to the terminal 16 to loop back onto the inductor L1. In some cases, the diode D1 is a diode in parallel with the transistor S1.

During the negative alternations of the voltage Vac, the transistor S1 is controlled in pulse width modulation to be periodically closed (on) and the transistor S2 remains permanently open (off). Furthermore, the source-drain diode D1 of the transistor S1 is reverse biased while the source-drain diode D2 of the transistor S2 is forward biased and serves as a freewheeling diode. During the closure pulses of the transistor S1, the inductor L1 stores energy. The current flows from the terminal 16, via the diode D3, the transistor S1 and the inductor L1 to the terminal 15. The DC load connected to the terminals 11 and 12 is powered by the energy stored in the energy storage element C1. At each opening of the transistor S2, the energy stored in the inductor L1 is transferred to the DC load. The current then flows from the inductor L1, via the terminals 15 then 16, the diode D3, to the positive terminal 11, then from the negative terminal 12, via the diode D2 to the inductor L1.

The inrush current limiting circuit 14 is used before each closure pulse of one of the transistors S1 and S2, in particular when farther away from the zero cross of the voltage Vac. Indeed, the voltage at the terminals of the transistor S1 or S2 when it is closed increases when approaching the middle of the corresponding alternation, which, without a limiting circuit would cause a current peak. The opening of the switch K, in a pulsewise manner, before each start of closure pulse of the transistors S1 and S2 so that the resistor R limits the charging current of capacitor C1, avoids these current peaks, in particular towards the middle of each alternation.

The converter in FIG. 1 is unidirectional, i.e. it can only operate as an AC-DC converter (rectifier mode). In some applications it is desirable to have a reversible converter, i.e. also capable of operating as a DC-AC converter. This is used, for example, to reinject energy into the electrical distribution network or to power a motor from a battery. The converter must then be capable of operating as an inverter.

The described embodiments provide for benefiting from the advantages of a totem pole architecture and the performance thereof to produce a reversible converter.

One example of an application of a reversible converter is to make it possible, with the same converter, both to supply a load from the electrical distribution network and to inject energy into the network when the load is not consuming.

Another example of an application of a reversible converter is to make it possible, with the same converter, both to power a motor (transfer of electrical-mechanical energy) from a battery and to recharge the battery (transfer of mechanical-electrical energy) from the rotation of the motor.

It is also conceivable to use MOS transistors instead of the diodes D3 and D4 in order to make the structure bidirectional. However, the need to limit the inrush current makes this a very restrictive solution in terms of control of the MOS transistors and space requirement and reliability of the circuit for limiting losses in steady state. The inrush current limiting circuit 14 is also essential.

Figure 2:
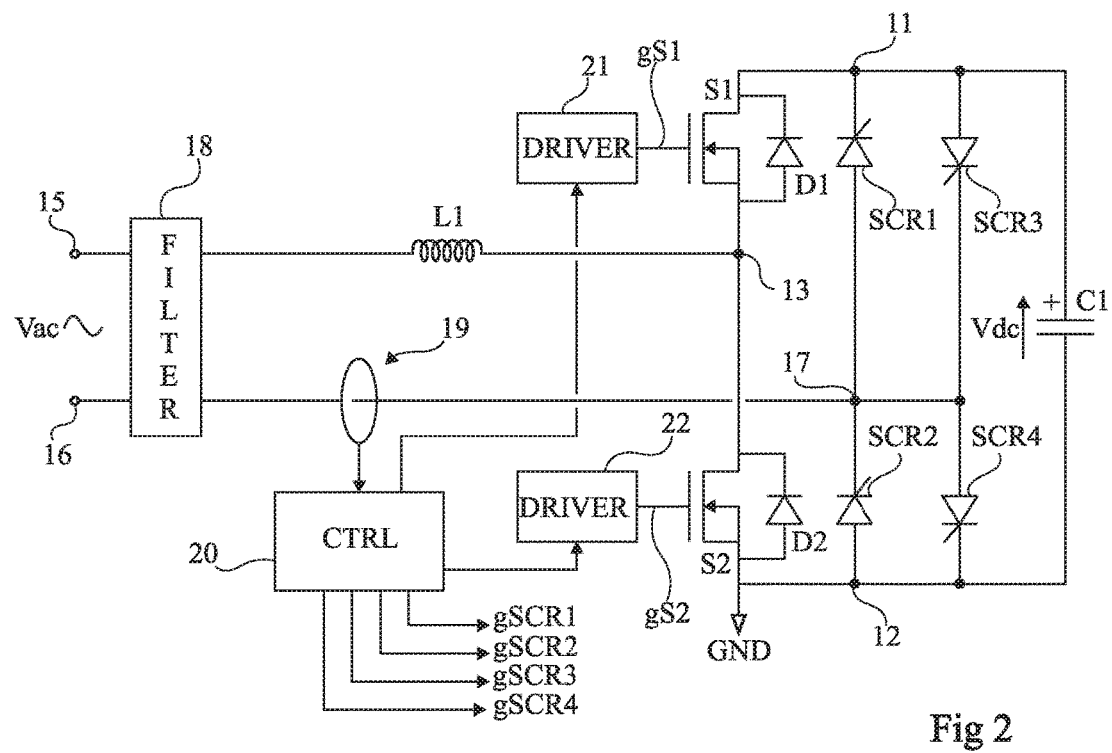
FIG. 2 schematically and partially represents, partly in the form of blocks, one embodiment of a reversible totem pole converter.

FIG. 2 schematically and partially represents, partly in the form of blocks, one embodiment of a reversible totem pole converter.

A totem pole structure is found with two field effect transistors S1 and S2, e.g. MOS transistors (here N-channel transistors), connected in series between two terminals 11 and 12 with a DC voltage Vdc. The drain of the transistor S1 is on the terminal 11 side and the source of the transistor S2 is on the terminal 12 side. A storage element C1 (capacitor or battery, for example) of the DC energy links the terminals 11 and 12, the terminal 11 being, arbitrarily, the positive terminal of the voltage Vdc.

The midpoint 13 between the two transistors S1 and S2 is linked, via an inductive element L1, to the first terminal 15 of an AC voltage Vac. According to the described embodiments, provision is made to replace the diodes D3 and D4 in FIG. 1 with four thyristors SCR1, SCR2, SCR3, SCR4. Two thyristors SCR1 and SCR2 are connected in series between the terminals 11 and 12, the anodes of the thyristors SCR1 and SCR2 being directed towards the terminal 12. Two thyristors SCR3 and SCR4 are connected in series between the terminals 11 and 12, the anodes of the thyristors SCR3 and SCR4 being directed towards the terminal 11. The midpoint 17 of the associations in series of the thyristors SCR1 and SCR2 and the thyristors SCR3 and SCR4 is common and is linked to a second terminal 16 of the AC voltage Vac. In the example of FIG. 2, the thyristors are all cathode triggered.

As will be seen later, thanks to the solution provided, an inrush current limiting circuit (14, FIG. 1) is not necessary.

The terminals 15 and 16 correspond, for example, to the connection terminals connecting to the electrical distribution network or to the terminals of a motor, etc., and an input filter 18, or mains filter, is preferably interposed between on the one hand the terminal 15 and the node 13 and, on the other hand, the terminal 16 and the midpoint 17. An element 19 for measuring the AC current is interposed between the filter 18 and the midpoint 17. The information representative of the current measured by the element 19, is used by a control circuit 20 (CTRL) for controlling the conduction periods of the transistors S1 and S2. The circuit 20 receives other information such as, for example, information representative of the voltage Vdc, information representative, in rectifier mode, of the requirements of the DC load connected to the terminals 11 and 12, etc. The circuit 20 supplies control signals to circuits (DRIVER) 21 and 22 for generating control signals for controlling the gates gS1 and gS2 of the respective transistors S1 and S2. The circuit 20 also supplies, directly or indirectly, control signals to the triggers gSCR1, gSCR2, gSCR3 and gSCR4 of the thyristors SCR1, SCR2, SCR3 and SCR4. The intrinsic source-drain diodes D1 and D2 of the transistors S1 and S2 are also represented in FIG. 2. As a variant, the diodes D1 and D2 may be additional components. According to another variant, the transistor S1 or S2 is switched on during the periods when the current has to flow in the diode D1, respectively D2. This makes it possible to reduce the losses by conduction in relation to a flow of current in the intrinsic diode D1 or D2. The transistors S1 and S2 are controlled in pulse width modulation. The pulse frequency is generally fixed and is markedly higher (ratio of at least 100, e.g. from a few kHz to a few hundreds of kHz) than the frequency of the voltage Vac (generally less than 100 Hz, typically 50 Hz or 60 Hz for the electrical distribution network). The converter neither raises nor reduces the voltage either in one direction or another. Only the AC-DC conversion and vice versa is concerned here. Where appropriate, other systems of conversion and regulation are present upstream or downstream for reducing or increasing the values of the voltages Vac and Vdc.

The use of thyristors in both conduction directions in a totem pole architecture seems at first sight useless because of the presence of the transistors S1 and S2. However, as is apparent from the embodiments below, the use of four thyristors instead of two diodes makes it possible not only to avoid the inrush current limiting circuit, but also to make the converter reversible with a particularly simple control.

FIGS. 3A, 3B, 3C, 3D, 3E, 3F, 3G and 3H illustrate, in the form of timing diagrams, the operation of the converter in FIG. 2 in AC-DC conversion mode in the course of a period of the AC voltage Vac.

Figure 3:
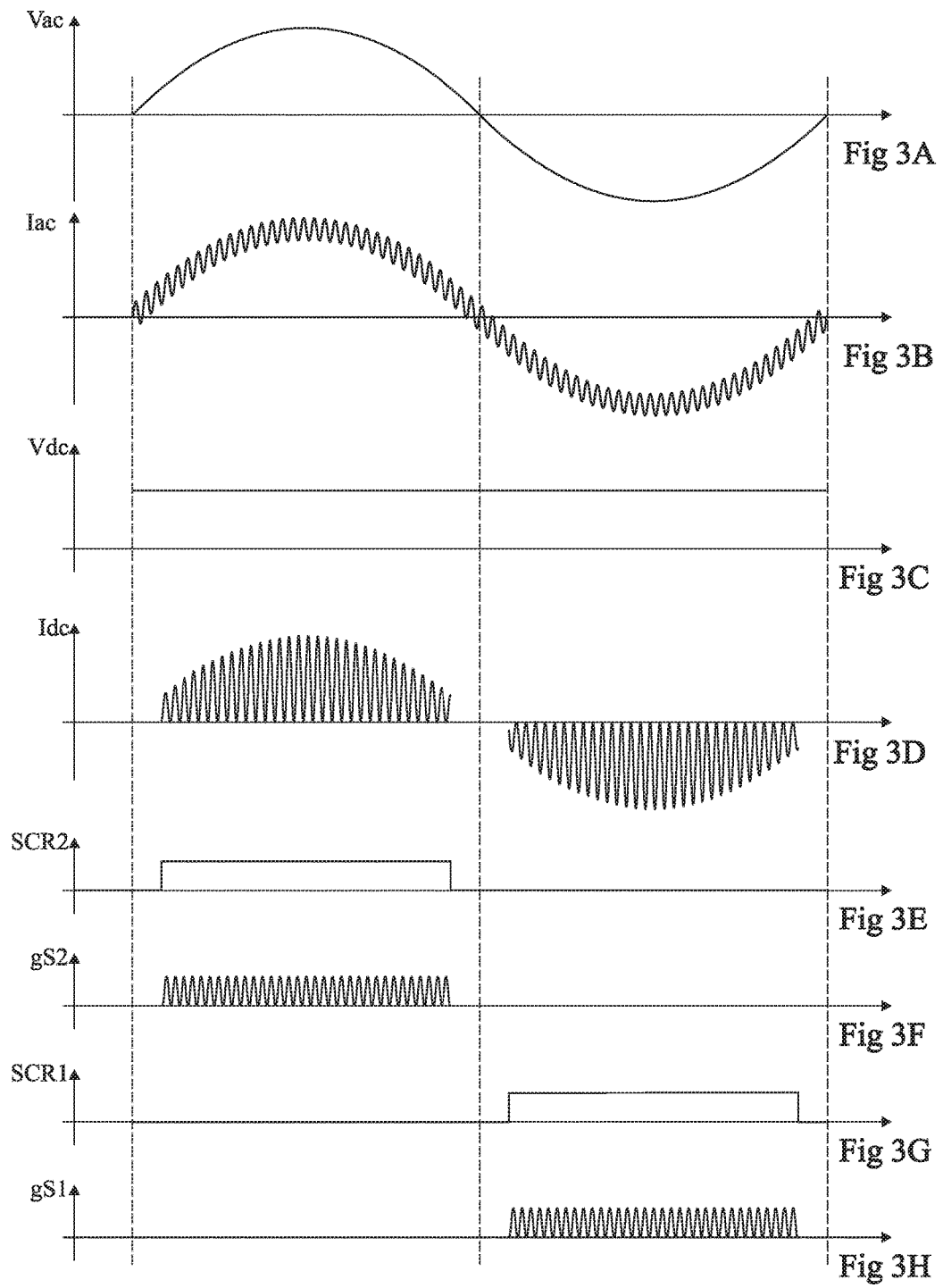
FIGS. 3A, 3B, 3C, 3D, 3E, 3F, 3G and 3H illustrate, in the form of timing diagrams, the operation of the converter in FIG. 2 in AC-DC conversion mode.

FIG. 3A represents an example of behavior of the voltage Vac between the terminals 15 and 16 (line or motor voltage). FIG. 3B represents a corresponding example of behavior of the current Iac or line or motor current. FIG. 3C represents an example of corresponding behavior of the voltage Vdc between the terminals 11 and 12 (battery voltage or of the capacitor C1). FIG. 3D represents a corresponding example of behavior of the current Idc on the DC voltage side. FIG. 3E represents an example of closure periods of the thyristor SCR2. FIG. 3F represents an example of corresponding behavior of the gate gS2 voltage of the transistor S2. FIG. 3G represents an example of closure periods of the thyristor SCR1. FIG. 3H represents an example of corresponding behavior of the gate gS1 voltage of the transistor S1.

Steady state is now considered, i.e. it is assumed that the capacitor C1 is at the charge level required by the application. The operation at start-up is similar but the voltage Vdc increases gradually over multiple alternations until reaching its nominal level set by the application. For simplifying the explanations, the presence of the filter 18 is ignored in what follows.

In AC-DC conversion mode, the thyristors SCR3 and SCR4 are not used and remain off.

The thyristor SCR2 is switched on during the positive alternations of the voltage Vac while the thyristor SCR1 is switched on during the negative alternations of the AC voltage. However, unlike the diodes D3 and D4 of the conventional case in FIG. 1, placing the thyristors SCR1 and SCR2 in conduction does not depend on the periods of conduction of the transistors S1 and S2, but is forced during the maximum possible duration of the positive and negative alternations. This duration covers at least the whole duration of the control pulse train of the transistors S1 and S2, and is set by the half-period of the AC voltage. Thus, the closure of the transistor S1 or S2 (according to the alternation of the voltage Vac) takes place while the voltage at the terminals of same is approximately zero. The control of the transistors S1 and S2 is not modified by the described embodiments. It will be noted that the thyristor SCR1 or SCR2 is switched off at the end of the alternation when the current which passes through is cancelled out (becomes less than the holding current of same).

During the positive alternations of the voltage Vac, the transistor S2 is controlled in pulse width modulation to be periodically closed (on) and the transistor S1 remains permanently open (off). Furthermore, the source-drain diode D2 of the transistor S2 is reverse biased while the source-drain diode D1 of the transistor S1 is forward biased and serves as a freewheeling diode. During the closure pulses of the transistor S2, the inductor L1 stores energy. The current flows from the terminal 15, via the inductor L1, the transistor S2 and the thyristor SCR2 to the terminal 16. The DC load connected to the terminals 11 and 12 is powered by the energy stored in the energy storage element C1 (capacitor or battery). At each opening of the transistor S2, the energy stored in the inductor L1 is transferred to the DC load. The current then flows from the inductor L1, via the diode D1 of the transistor S1 to the positive terminal 11, then from the negative terminal 12, via the thyristor SCR2 to the terminal 16 to loop back onto the inductor L1.

During the negative alternations of the voltage Vac, the transistor S1 is controlled in pulse width modulation to be periodically closed (on) and the transistor S2 remains permanently open (off). Furthermore, the source-drain diode D1 of the transistor S1 is reverse biased while the source-drain diode D2 of the transistor S2 is forward biased and serves as a freewheeling diode. During the closure pulses of the transistor S1, the inductor L1 stores energy. The current flows from the terminal 16, via the thyristor SCR1, the transistor S1 and the inductor L1 to the terminal 15. The DC load connected to the terminals 11 and 12 is powered by the energy stored in the energy storage element C1. At each opening of the transistor S2, the energy stored in the inductor L1 is transferred to the DC load. The current then flows from the inductor L1, via the terminals 15 then 16, the thyristor SCR1, to the positive terminal 11, then from the negative terminal 12, via the diode D2 to the inductor L1.

The use of four thyristors has another advantage which is to allow operation as an inverter, i.e. in DC-AC conversion.

FIGS. 4A, 4B, 4C, 4D, 4E, 4F, 4G and 4H illustrate, in the form of timing diagrams, the operation of the converter in FIG. 2 in DC-AC conversion mode in the course of a period of the AC voltage Vac.

Figure 4:
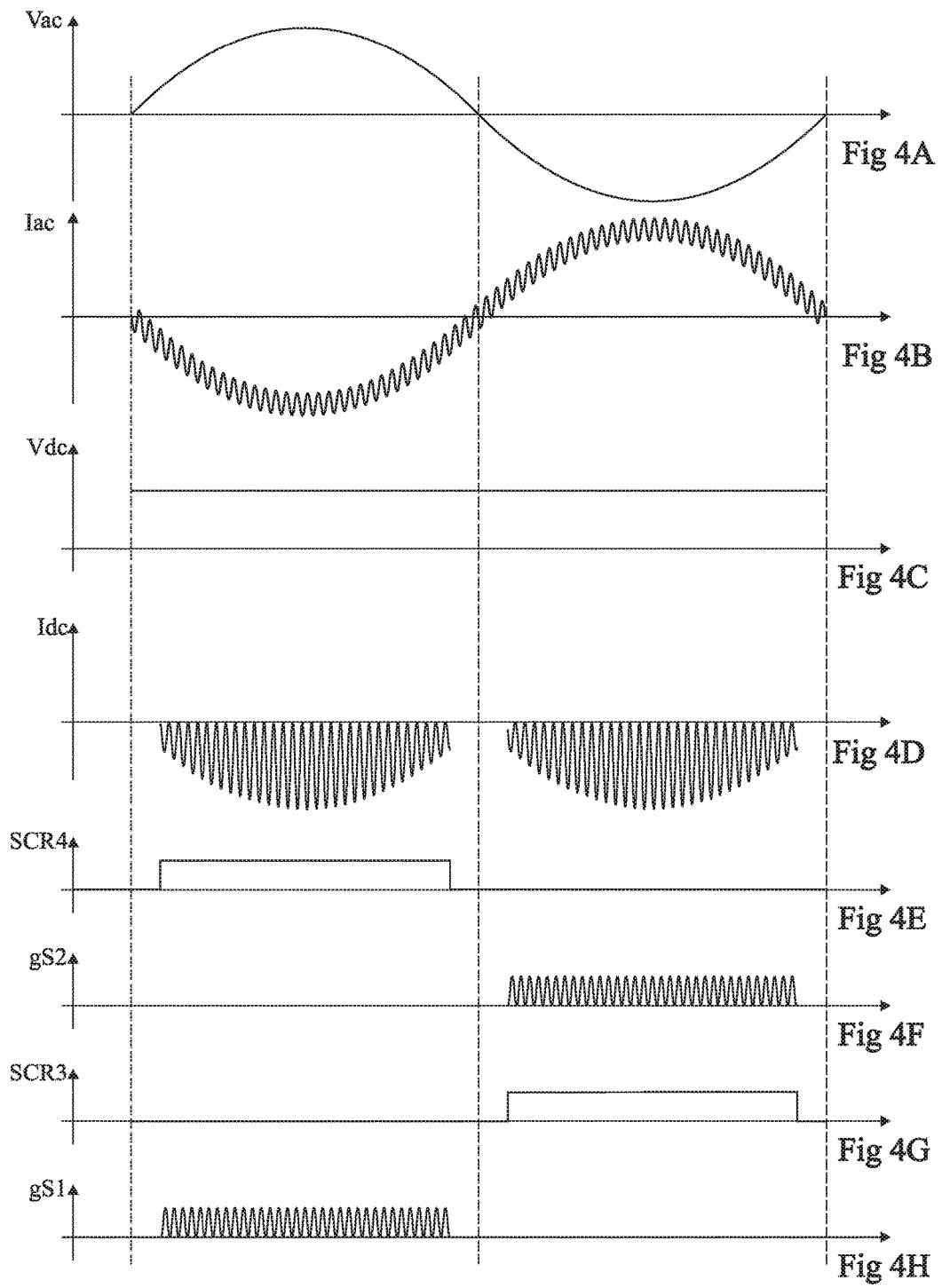
FIGS. 4A, 4B, 4C, 4D, 4E, 4F, 4G and 4H illustrate, in the form of timing diagrams, the operation of the converter in FIG. 2 in DC-AC conversion mode.

FIG. 4A represents an example of behavior of the voltage Vac between the terminals 15 and 16 (line or motor voltage). FIG. 4B represents a corresponding example of behavior of the current Iac or line or motor current. FIG. 4C represents an example of corresponding behavior of the voltage Vdc between the terminals 11 and 12 (battery voltage or of the capacitor C1). FIG. 4D represents a corresponding example of behavior of the current Idc on the DC voltage side. FIG. 4E represents an example of closure periods of the thyristor SCR4. FIG. 4F represents an example of corresponding behavior of the gate gS2 voltage of the transistor S2. FIG. 4G represents an example of closure periods of the thyristor SCR3. FIG. 4H represents an example of corresponding behavior of the gate gS1 voltage of the transistor S1.

In inverter mode, the question of the steady state of the voltage Vdc does not arise. Indeed, here it is a matter of transferring energy from the DC source (charged battery, for example) to the AC load.

For operating as an inverter, i.e., for example, reinjecting energy into the electrical distribution network or powering a motor, the direction of flow of the current in the converter must be reversed with respect to the case of the AC-DC converter. Thus, with the same sign conventions, the current Idc is always negative. Furthermore, the sign of the current Iac is reversed with respect to the sign of the voltage Vac, i.e. it is negative during the positive alternations and positive during the negative alternations.

As for the rectifier mode, the thyristor SCR4 is switched on continuously during the positive alternations of the AC voltage Vac while the thyristor SCR3 is switched on continuously during the negative alternations of the AC voltage Vac. However, on the transistors S1 and S2 side, unlike the rectifier mode, the transistor S1 is controlled during the positive alternations and the transistor S2 is controlled during the negative alternations of the voltage Vac. The transistors S1 and S2 are always pulse controlled, preferably in pulse width modulation if the AC load is likely to vary (e.g. in the case of a motor).

In DC-AC conversion mode, the thyristors SCR1 and SCR2 are not used and remain off.

During the positive alternations of the voltage Vac, the transistor S1 is controlled in pulse width modulation to be periodically closed (on) and the transistor S2 remains permanently open (off). Furthermore, the source-drain diode D1 of the transistor S1 is reverse biased while the source-drain diode D2 of the transistor S2 is forward biased and serves as a freewheeling diode. During the closure pulses of the transistor S1, the inductor L1 stores energy. The current flows from the terminal 11, via the transistor S1 and the inductor L1 to the terminal 15, then from the terminal 16, via the thyristor SCR4 to the terminal 12. At each opening of the transistor S1, the energy stored in the inductor L1 is transferred to the AC network (or to the motor). The current then flows from the inductor L1 to the terminal 15, then from the terminal 16, via the thyristor SCR4 and the diode D2 to the inductor L1.

During the negative alternations of the voltage Vac, the transistor S2 is controlled in pulse width modulation to be periodically closed (on) and the transistor S1 remains permanently open (off). Furthermore, the source-drain diode D2 of the transistor S2 is reverse biased while the source-drain diode D1 of the transistor S1 is forward biased and serves as a freewheeling diode. During the closure pulses of the transistor S2, the inductor L1 stores energy. The current flows from the terminal 11, via the thyristor SCR3 to the terminal 16, then from the terminal 15, via the inductor L1 and the transistor S2 to the terminal 12. At each opening of the transistor S2, the energy stored in the inductor L1 is transferred to the AC network. The current then flows from the inductor L1, via the diode D1, the thyristor SCR3 to the terminal 16, and loops back via the terminal 15 into the inductor L1.

In relation to the rectifier mode, it is made sure that at each end of alternation, the control pulses of the transistors S1 and S2 are halted sufficiently early to ensure that the current Iac is zero at the end of the alternation.

The applications more particularly targeted are applications in which the voltages Vac and Vdc have amplitudes greater than 100 volts. However, the control signals of the transistors S1 and S2 and the thyristors SCR1 to SCR4 have amplitudes ranging from a few volts to 10-20 volts. Consequently, circuits must be provided for generating these control signals having appropriate voltage references.

The following figures highlight the power supply connections and potentials required for the control signals of the transistors and triacs in various embodiments.

Figure 5:
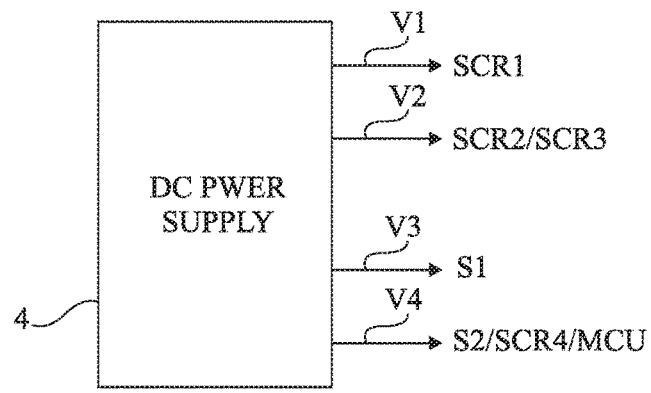
FIG. 5 schematically and in a simplified way represents one embodiment of a circuit for generating DC voltages for control circuits of a reversible totem pole converter, adapted to the embodiment in FIG. 2.

FIG. 5 schematically and in a simplified way represents one embodiment of a circuit 4 (DC POWER SUPPLY) for generating DC voltages for control circuits of a reversible totem pole converter, adapted to the embodiment in FIG. 2.

In the embodiment in FIG. 2, the circuit 4 must generate four DC voltages V1, V2, V3 and V4 of different amplitudes, respectively intended for the thyristor SCR1, the thyristors SCR2 and SCR3, the control circuit 21 of the transistor S1, and common to the control circuit of the transistor S2, the thyristor SCR4 and the circuit 20 (e.g. a microcontroller).

On the transistor S2 side, its source being the ground GND (potential of the terminal 12), the reference potential of its gate gS2 control signal may also be the ground GND. The circuit 22 is powered by a positive voltage V4, e.g. of the order of 15 volts, which may be used to generate a voltage of a few volts of power supply of the circuit 20. Similarly, a trigger current may be injected from this voltage of a few volts referenced to the ground GND in the thyristor S4 the cathode of which is at the ground GND.

On the transistor S1 side, the voltage of the terminal 11 is too high to allow a control gS1 referenced to the ground GND. Preferably, provision is made to reference a DC power supply voltage, e.g. of a given value chosen between a few volts and about fifteen volts, from the circuit 21 to the node 13. As the node 13 corresponds to the source of the transistor S1, a positive gate-to-source voltage is ensured regardless of the potential of the node 13 (which evolves with the voltage Vac). To this end, a voltage V3 is generated, e.g. 15 volts (referenced to the ground GND). The application of this voltage for powering the circuit 21 requires a change of voltage reference. One embodiment will be described in relation to FIG. 6.

On the thyristor SCR1 side, a voltage V1 must be generated, which may also not be referenced to the ground GND. Preferably, this voltage is generated with a reference to the potential of the terminal 11. One example of a circuit applying the voltage V1 to the trigger of the thyristor SCR1 for injecting a trigger current will be deduced subsequently from the disclosure of FIG. 6. One example of a circuit generating this voltage V1 may be deduced from the disclosure of FIG. 8.

On the thyristors SCR2 and SCR3 side, a trigger current must also be injected with a different ground GND reference voltage. The voltage V2 is, preferably, also referenced to the potential of the midpoint 17. Here again, an example of a circuit for generating this voltage V2 and its application to the triggers of the thyristors SCR2 and SCR3 will be deduced subsequently from the disclosure of FIG. 6.

Figure 6:
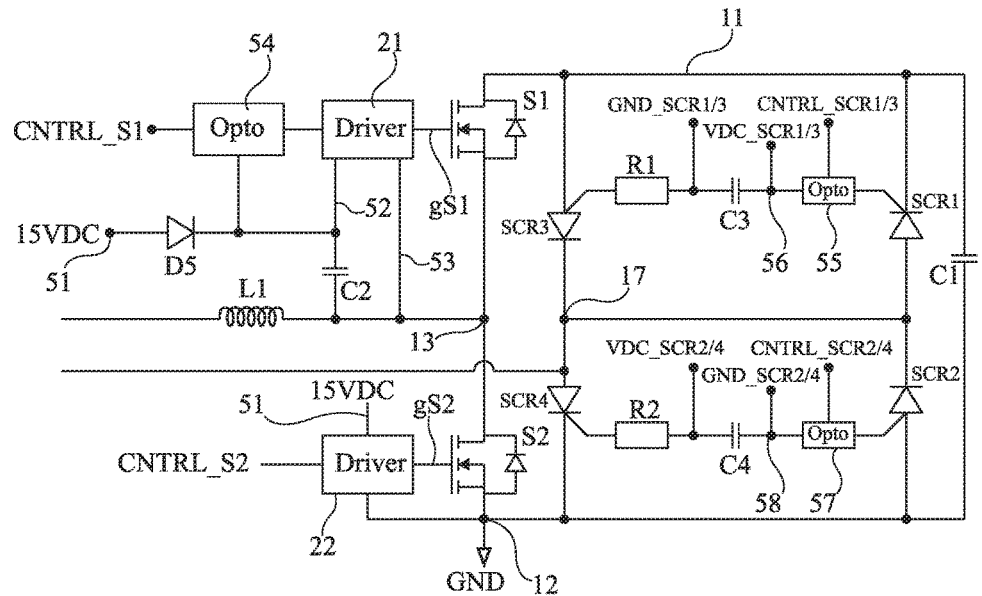
FIG. 6 schematically and partially in the form of blocks, represents another embodiment of a reversible totem pole converter.

FIG. 6 schematically and partially in the form of blocks, represents another embodiment of a reversible totem pole converter.

In relation to the diagram in FIG. 2, the thyristors SCR2 and SCR3 are anode triggered thyristors. The rest of the circuit set-up is not modified. The consequence is that the voltage references of the triggers of the thyristors SCR2 and SCR3 should be modified in order to extract a trigger current for energizing same. FIG. 6 also illustrates a circuit set-up for generating the voltage V3 (power supply of the circuit 21) from the voltage V4 (15 VDC) and illustrates the power supply of the circuit 22 by the voltage V4 (15 VDC).

Thus, as mentioned, the source of the transistor S2 being the ground GND (potential of the terminal 12), the reference potential of its gate gS2 control signal may also be the ground GND. The circuit 22 is therefore, for example, powered by a positive voltage 15 VDC (terminal 51), of 15 volts, referenced to the ground GND and receives a low voltage digital signal CTRLS2 (of a few volts, e.g. 3-5 volts) from the circuit 20 (e.g. a microcontroller).

On the transistor S1 side, the voltage of the terminal 11 is too high to allow a control gS1 referenced to the ground GND. In the example of FIG. 6, provision is made to reference the power supply voltage, e.g. 15 volts, of the circuit 21 to the node 13. As the node 13 corresponds to the source of the transistor S1, a positive gate-to-source voltage is ensured regardless of the potential of the node 13 (which evolves with the voltage Vac). A potential 15 VDC of 15 volts (referenced to the ground GND) is applied (terminal 51) to the anode of a diode D5 the cathode of which is linked to a terminal 52 for applying the positive power supply potential of the circuit 21. A terminal 53 for applying the reference potential of the circuit 21 is connected to the node 13. A capacitor C2 links the cathode of the diode D5 to the node 13 for adapting the voltage reference of 15 volts powering the circuit 21. Because of the voltage reference change, a low voltage control signal CTRLS1, supplied by the circuit 20, is applied via an optocoupler 54 (Opto) the conduction terminals of which (the emitter and the collector of the bipolar output phototransistor) are respectively linked to the terminal 52 and to a control input terminal of the circuit 21. The signal CTRLS1 is applied to the control terminal of the optocoupler (the anode of its photodiode) by being referenced to the ground GND.

On the thyristors SCR1 and SCR3 side, the conduction terminals (emitter and collector of the phototransistor) of the transistor of an optocoupler 55 (Opto) are connected to an electrode of a capacitor C3 defining a terminal 56 for applying a positive potential VDC_SCR1/3 of an isolated (floating) DC power supply (e.g. of the order of 15 volts) referenced to a floating ground GND_SCR1/3, and to the trigger of the thyristor SCR1 for injecting a trigger current therein. The floating ground terminal GND_SCR1/3 of this isolated power supply is further linked, via a resistor R1, to the (anode) trigger of the thyristor SCR3, for extracting a trigger current. A low voltage control signal CNTRL_SCR1/3, supplied by the circuit 20, is applied to the control terminal of the optocoupler 55 (the anode of its photodiode) by being referenced to the ground GND. When the signal CNTRL_SCR1/3 is active, the transistor of the optocoupler 55 is switched on and a current flows from the terminal 56, into the trigger of the thyristor SCR1 (which is energized) to the terminal 11, to the anode of the thyristor SCR3 and is extracted from its trigger (the thyristor SCR3 is therefore energized) to return to the floating ground GND_SCR1/3.

On the thyristors SCR2 and SCR4 side, the conduction terminals (emitter and collector of the phototransistor) of the transistor of an optocoupler 57 (Opto) are connected to the anode trigger of the thyristor SCR2 for taking a trigger current therefrom and to an electrode of a capacitor C4 defining a terminal 58 for applying a floating ground GND_SCR2/4 of an isolated DC power supply (e.g. of the order of 15 volts) referenced to this floating ground. A positive potential VDC_SCR2/4 of this isolated power supply is applied by a resistor R2, to the (cathode) trigger of the thyristor SCR4 for injecting a trigger current therein. A low voltage control signal CNTRL_SCR2/4, supplied by the circuit 20, is applied to the control terminal of the optocoupler 55 (the anode of its photodiode) by being referenced to the ground GND. When the signal CNTRL_SCR2/4 is active, the transistor of the optocoupler 55 is switched on and a current flows from the potential VDC_SCR2/4, into the trigger of the thyristor SCR4 (which is energized), to the terminal 12, to the anode of the thyristor SCR2 and is extracted from its trigger (the thyristor SCR2 is therefore energized) to return to the terminal 58.

Figure 7:
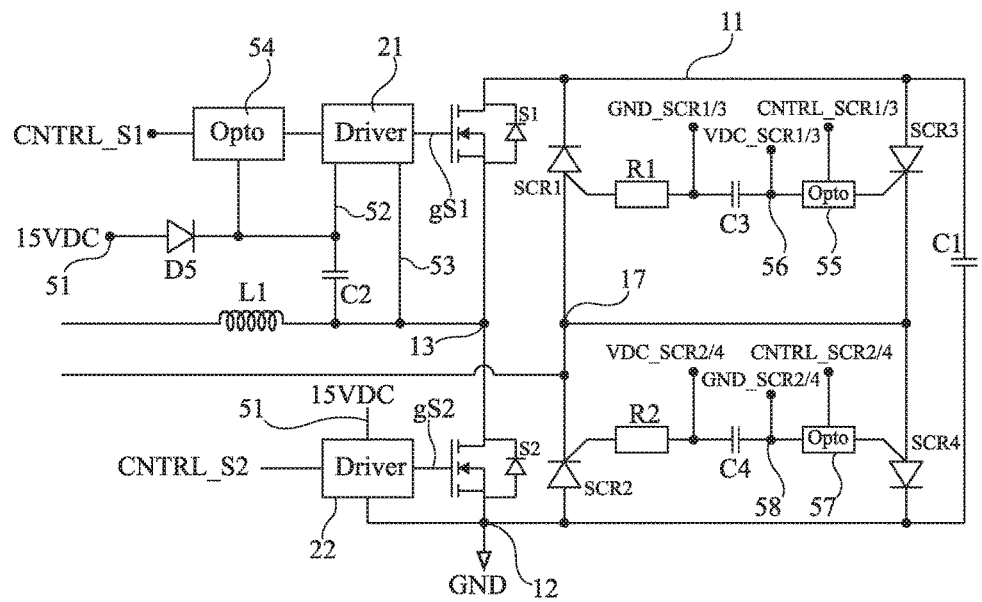
FIG. 7 schematically and partially in the form of blocks, represents another embodiment of a reversible totem pole converter.

FIG. 7 schematically and partially in the form of blocks, represents another embodiment of a reversible totem pole converter.

In relation to the diagram in FIG. 2, the thyristors SCR1 and SCR4 are anode triggered and the thyristors SCR2 and SCR3 are cathode triggered. The consequence is on the side of the voltage references for applying the control signals of the thyristors, the rest of the circuit not being modified. In relation to FIG. 6, the control circuit set-ups (optocoupler 55, capacitor C3, resistor R1, application of the relative potentials VDC_SCR1/3 and GND_SCR1/3; optocoupler 57, capacitor C4, resistor R2, application of the relative potentials VDC_SCR2/4 and GND_SCR2/4) are identical. The difference is that, on the thyristors SCR1 and SCR3 side, it is the trigger of the thyristor SCR1 (instead of that of the thyristor SCR3) which is linked to the resistor R1 and it is the trigger of the thyristor SCR3 (instead of that of the thyristor SCR1) which is linked to the optocoupler 55. On the thyristors SCR2 and SCR4 side, it is the trigger of the thyristor SCR2 (instead of that of the thyristor SCR4) which is linked to the resistor R2 and it is the trigger of the thyristor SCR4 (instead of either via the terminals 11 and 12 respectively).

Figure 8:
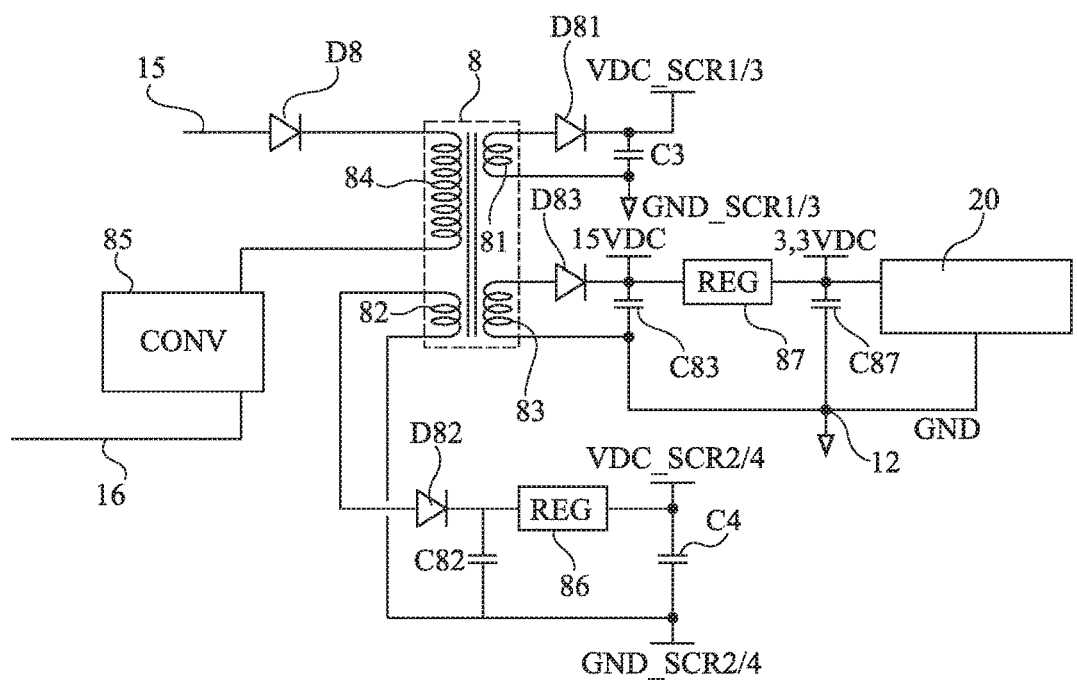
FIG. 8 schematically and partially in the form of blocks, represents an embodiment of a circuit for generating DC voltages for control circuits of the converters in FIGS. 6 and 7.

FIG. 8 schematically and partially in the form of blocks, represents an embodiment of a circuit for generating DC voltages for control circuits of the converters in FIGS. 6 and 7.

This figure illustrates an example of circuit set-up for generating the potentials VDC_SCR1/3, GND_SCR1/3, VDC_SCR2/4, GND_SCR2/4, 15 VDC and 3.3 VDC (of the microcontroller 20 power supply) from the AC voltage Vac.

A transformer 8 with three secondary windings 81, 82 and 83 is used. A primary winding 84 of the transformer 8 is linked between the terminal 15 via a rectifier diode D8 (e.g. only the positive alternations are used for generating the power supplies) and a terminal of a switching converter 85 (CONV), e.g. an integrated circuit known under the trade name of VIPER, the other terminal of which is linked to the terminal 16 (FIGS. 5 to 7).

The first secondary winding 81 of the transformer 8 supplies the floating voltage VDC_SCR1/3-GND_SCR1/3. For this, a first terminal of the winding 81 defines the potential GND_SCR1/3 and is linked to the resistor R1. A second terminal of the winding 81 is linked at the input (anode) of a rectifying element D81 (e.g. a diode). The output (cathode) of the rectifying element D8 defines the potential VDC_SCR1/3 and is linked to the terminal 56.

The second secondary winding 82 of the transformer 8 supplies the floating voltage VDC_SCR2/4-GND_SCR2/4. For this, a first terminal of the winding 82 defines the potential GND_SCR2/4 and is linked, in the embodiment in FIGS. 6 and 7, to the terminal 58. A second terminal of the winding 82 is linked at the input (anode) of a rectifying element D82 (e.g. a diode). The output (cathode) of the rectifying element D82 defines the potential VDC_SCR2/4 and is linked via a linear regulator 86 (REG), in the embodiment in FIGS. 6 and 7, to the resistor R2. A capacitor C82 links the cathode of the diode D83 to the floating ground GND_SCR2/4.

The third secondary winding 83 of the transformer 8 supplies the voltage 15 VDC-GND. For this, a first terminal of the winding 83 defines the potential GND and is linked to the terminal 12. A second terminal of the winding 83 is linked at the input (anode) of a rectifying element D83 (e.g. a diode). The output (cathode) of the rectifying element D83 defines the potential 15 VDC and is linked to the terminal 51. A capacitor C83 links the cathode of the diode D83 to the ground GND.

The amplitudes of the voltages VDC_SCR1/3-GND_SCR1/3, VDC_SCR2/4-GND_SCR2/4 and 15 VDC-GND depend on the transformation ratios of the windings 81, 82 and 83 in relation to the winding 84.

In the example represented, the voltage 15 VDC is used to generate the low voltage 3.3 VDC (e.g. 3.3 volts) referenced to the ground GND for the circuit or microcontroller 20. For this, a linear regulator 87 (REG) is used, for example. A capacitor C87 links the output of the converter to the terminal 12 (the ground GND).

Figure 9:
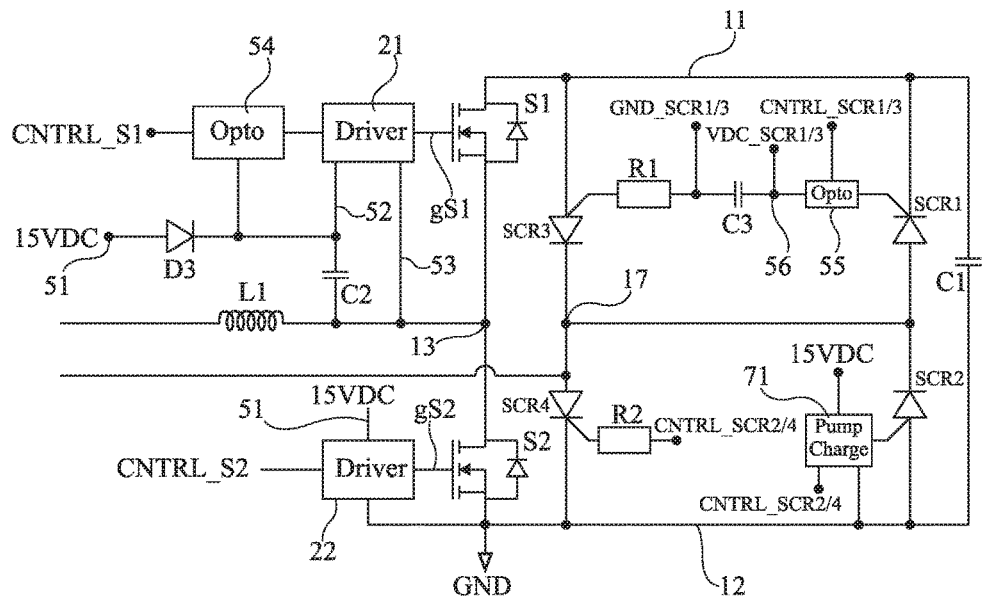
FIG. 9 schematically and partially in the form of blocks, represents another embodiment of a reversible totem pole converter.

FIG. 9 schematically and partially in the form of blocks, represents a variant of the embodiment in FIG. 6 in which the control signal CNTRL_SCR2/4, referenced to the ground GND, is applied to the cathode trigger of the thyristor SCR4 via the resistor R2 and to the anode trigger of the thyristor SCR2 via a pump charge circuit 71 powered by the voltage 15 VDC. The rest of the circuit set-up is not modified in relation to FIG. 6.

Figure 10:
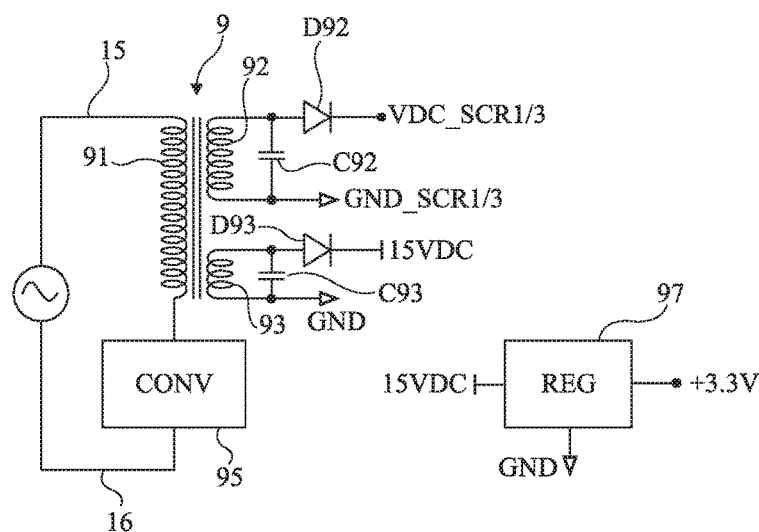
FIG. 10 schematically and partially in the form of blocks, represents an embodiment of a circuit for generating DC power supply voltages for control circuits of the converter in FIG. 9.

FIG. 10 schematically and partially in the form of blocks, represents an embodiment of a circuit for generating DC power supply voltages for control circuits of the converter in FIG. 9.

This figure illustrates an example of circuit set-up for generating potentials VDC_SCR1/3, GND_SCR1/3 and 15 VDC from the AC voltage Vac.

A transformer 9 with two secondary windings 92 and 93 is used. A primary winding 91 of the transformer is linked between the terminal 15 and a terminal of a switching converter 95 (CONV), e.g. an integrated circuit known under the trade name of VIPER, the other terminal of which is linked to the terminal 16.

A first secondary winding 92 of the transformer 9 supplies the voltage VDC_SCR1/3-GND_SCR1/3. For this, a first terminal of the winding 92 defines the potential GND_SCR1/3 and is linked to the resistor R1 (FIG. 9). A second terminal of the winding 92 is linked at the input (anode) of a rectifying element D92 (e.g. a diode) and a capacitor C92 links the two terminals of the winding 92. The output (cathode) of the rectifying element D92 defines the potential VDC_SCR1/3 and is linked to the terminal 56 (FIG. 9).

A second secondary winding 93 of the transformer 9 supplies the voltage 15 VDC-GND. For this, a first terminal of the winding 93 defines the potential GND and is linked to the terminal 12. A second terminal of the winding 93 is linked at the input (anode) of a rectifying element D93 (e.g. a diode). A capacitor C93 links the two terminals of the winding 93. The output (cathode) of the rectifying element D93 defines the potential 15 VDC and is linked to the terminal 51.

The amplitudes of the voltages VDC_SCR1/3-GND_SCR1/3 and 15 VDC-GND depend on the transformation ratios of the windings 92 and 93 in relation to the winding 94.

Here also, the voltage 15 VDC-GND may be used to generate the low voltage (e.g. 3.3 volts) referenced to the ground GND for the circuit or microcontroller 20. For this, a linear regulator 97 (REG) is used, for example.

One advantage of the described embodiments is that the totem pole converter thus produced is particularly efficient. In particular, it overcomes the need for an inrush current limiting circuit, while obtaining a reversible converter.

Particular embodiments have been described. Various variants and modifications will be apparent to the person skilled in the art. In particular, the choice of circuit set-up from among those of FIG. 2, 6, 7 or 9 depends on the application and the circuit used to generate the control voltages. Indeed, the circuits in FIGS. 8 and 10 are only examples and the voltages present in the rest of the application may be used as a variant. Moreover, the practical implementation of the embodiments and the dimensioning of the components is within the grasp of the person skilled in the art from the functional description given above.

The invention claimed is:

1. A reversible converter, comprising:
a first field effect transistor and a second field effect transistor coupled in series between a first terminal and a second terminal associated with a DC voltage;
an inductive element linking a first midpoint of the series coupling of the first and second field effect transistors to a first terminal associated with an AC voltage;
a first thyristor and a second thyristor coupled in series between the first and second terminals associated with the DC voltage, wherein a second midpoint of the series coupling of the first thyristor and the second thyristor is linked to a second terminal associated with said AC voltage, and wherein an anode of the first thyristor and a cathode of the second thyristor are coupled to said second midpoint; and
a third thyristor and a fourth thyristor coupled in series between the first and second terminals associated with the DC voltage, wherein a third midpoint of the series coupling of the third thyristor and the fourth thyristor is directly connected to the second midpoint, and wherein a cathode of the third thyristor and an anode of the fourth thyristor are coupled to said third midpoint.

2. The converter according to claim 1, further comprising:
a first diode connected in parallel with the first field effect transistor, wherein an anode terminal of the first diode coupled to the first midpoint; and
a second diode connected in parallel with the second field effect transistor, wherein a cathode terminal of the second diode is coupled to the first midpoint.

3. The converter according to claim 2, wherein each diode of the first and second diodes is an intrinsic drain-source diode of a field effect transistor.

4. The converter according to claim 1, wherein the first, second, third and fourth thyristors are cathode gated.

5. The converter according to claim 1, wherein:
the first thyristor and the fourth thyristor are cathode gated; and
the second thyristor and the third thyristor are anode gated.

6. The converter according to claim 1, wherein:
the first thyristor and the fourth thyristor are anode gated; and
the second thyristor and the third thyristor are cathode gated.

7. The converter according to claim 1, further comprising a control circuit configured to control converter operation, in an AC-DC conversion mode, by:
switching the second thyristor on continuously during alternations of a first sign of the AC voltage;
switching the first thyristor on continuously during alternations of a second sign of the AC voltage;
pulse controlling the second field effect transistor during the alternations of the first sign; and
pulse controlling the first field effect transistor during the alternations of the second sign.

8. The converter according to claim 1, further comprising a control circuit configured to control converter operation, in a DC-AC conversion mode, by:
switching the fourth thyristor on continuously during alternations of a first sign of the AC voltage;
switching the third thyristor on continuously during alternations of a second sign of the AC voltage;
pulse controlling the first field effect transistor during the alternations of the first sign; and
pulse controlling the second field effect transistor during the alternations of the second sign.

9. The converter according to claim 1:
wherein a cathode of the first thyristor is directly connected to the first terminal and an anode of the second thyristor is directly connected to the second terminal; and
wherein an anode of the third thyristor is directly connected to the first terminal and a cathode of the first thyristor is directly connected to the second terminal.

10. A reversible converter, comprising:
a first field effect transistor and a second field effect transistor coupled in series between DC voltage terminals;
a first thyristor and a second thyristor coupled in series between said DC voltage terminals;
a third thyristor and a fourth thyristor coupled in series between said DC voltage terminals with an opposite polarity with respect to the first and second thyristors;
wherein a first midpoint of connection between the first and second field effect transistors and a common second midpoint of connection between both the first and second thyristors and the third and fourth thyristors are coupled to AC voltage terminals; and
a control circuit configured to control actuation of the first and second field effect transistors and the first, second, third and fourth triacs to selectively operate the converter in a DC-AC conversion mode and an AC-DC conversion mode.

11. The converter according to claim 10, wherein the control circuit, when operating in the AC-DC conversion mode:
switches the second thyristor on continuously during alternations of a first sign of the AC voltage;
switches the first thyristor on continuously during alternations of a second sign of the AC voltage;
pulse controls the second field effect transistor during the alternations of the first sign; and
pulse controls the first field effect transistor during the alternations of the second sign.

12. The converter according to claim 10, wherein the control circuit, when operating in the DC-AC conversion mode:
switches the fourth thyristor on continuously during alternations of a first sign of the AC voltage;
switches the third thyristor on continuously during alternations of a second sign of the AC voltage;
pulse controls the first field effect transistor during the alternations of the first sign; and
pulse controls the second field effect transistor during the alternations of the second sign.

13. The converter according to claim 10, further comprising an inductor coupled between one of the midpoints and one terminal of the AC voltage.

14. The converter according to claim 10, wherein anodes of the first and fourth thyristors are directly connected to the common second midpoint and wherein cathodes of the second and third thyristors are directly connected to the common second midpoint.

* * * * *